T. T. Prosser.
Gas Furnace.
N° 89,239. Patented Apr. 20, 1869.
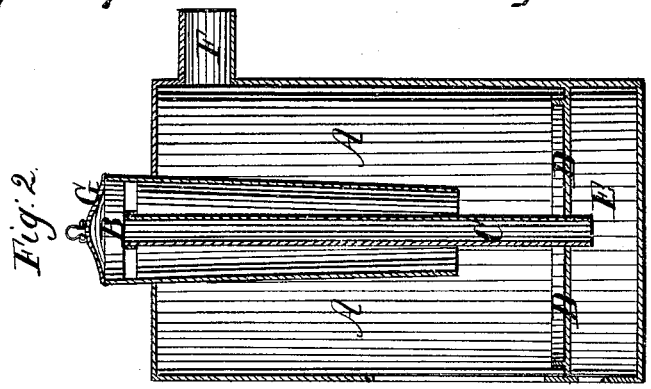
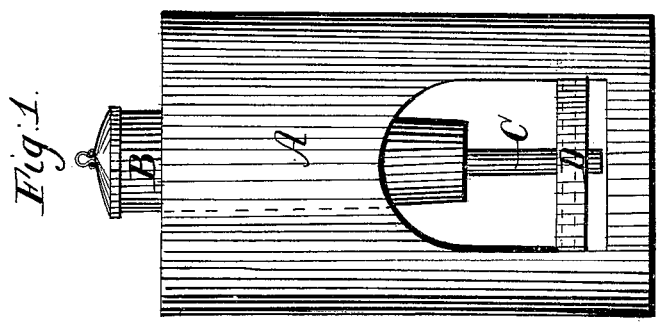
Witnesses.                              Inventor:

TREAT T. PROSSER, OF CHICAGO, ILLINOIS.

Letters Patent No. 89,239, dated April 20, 1869.

IMPROVED FURNACE FOR LIBERATING AND USING THE GASEOUS PRODUCTS OF COAL.

The Schedule referred to in these Letters Patent and making part of the same.

*To all whom it may concern:*

Be it known that I, TREAT T. PROSSER, of Chicago, in the county of Cook, and State of Illinois, have invented a new and useful Improvement in Furnaces for Liberating and Utilizing the Gaseous Products of Coal; and I do hereby declare that the following is a full, clear, and exact description of the same, reference being had to the annexed drawings, making part of this specification, in which—

Figure 1 is an elevation of one form of furnace, constructed in accordance with my invention, showing the magazine for coals, and the pipe, or conduit for conducting the gases to the space below the grate, and Figure 2 is a vertical sectional elevation of the furnace, showing the discharge-aperture, for the heated products of combustion.

Corresponding letters in both figures refer to corresponding parts.

This invention relates to that class of furnaces in which coals are burned, for the purpose of generating heat, to be used in smelting ores, puddling iron, melting glass, and for various other purposes; and It consists in a furnace, so constructed as to contain or be connected with a magazine or reservoir, containing coals, from which the gaseous substances are to be distilled by the fire upon the grate of said furnace, and said gaseous substances returned to the space below the grate, by means of a pipe or conduit, leading from the upper portion of such magazine, to the space below such grate.

It is well known that the coals usually employed for the purposes to which my invention is applicable, contain large quantities of hydrogen, and other volatile gases, which are liberated by heat, and which, if permitted to do so, escape before their combustion is effected, thus causing a loss of fuel, equal in amount to that which would represent the heat contained in such wasted gases; and, as a large amount of heat can be developed by their combustion and that of the carbon they carry off, it is important to prevent such escape, and utilize them in generating heat, with which to produce some useful effect.

Owing to the volatile nature of the gases referred to, they are seldom available in the ordinary furnaces; but by my arrangement they are readily caught and controlled, and are effectually utilized, by having the large amount of oxygen required for their combustion, mingled with them, below the grate of the furnace.

A, in the drawings, represents a furnace, which, in practice, is to be constructed in any form desired, for the purpose to which it is to be applied, one form being shown in the drawings, and it is to be of any material suited to such purposes, such as fire-bricks, or stone capable of resisting the heat; or it may be partly of iron, and partly of such bricks or stones; and it may also be of any size and shape required.

B is a magazine or reservoir for coals, the upper portion of which also serves as a reservoir for the gases, it being placed over or above the grate.

Into this reservoir the coal is fed, through an aperture in its upper or outer end, which is to be closed gas-tight by means of the cover G, attached to such reservoir.

As the coals falling and resting upon the grate below and outside of the magazine, are ignited, and that portion in the lower part of the magazine becomes heated, the gases are liberated, and they, being much lighter than air, or the carbonic-acid gas, arise and fill the upper portion of the magazine, where they accumulate until the pressure forces them into the pipe or conduit C, by which they are conveyed to the space below the grate, as above described.

C is a pipe or conduit, for conveying the gases from the reservoir to the furnace, as described. It is shown, in the drawings, as passing directly through the magazine and through the furnace; but it is apparent that it may leave the upper part of the magazine at any point upon its surface, and be carried down outside of the furnace, and then enter the space below the grate, which arrangement will be necessary in cases where the heat would be so great as to destroy the pipe.

D is the grate of the furnace, which may be constructed and arranged in any convenient manner.

E is the space below the grate, into which the gases are conducted by the conduit C, where they are to be mingled with oxygen, preparatory to being passed up through the grate, and through the incandescent fuel thereon, by which such gases are ignited, and caused to yield up their heat, which may be utilized at any point where it may be required.

F is an aperture, through which the heated products of combustion may pass to any desired locality.

I have shown and described but one form of furnace to which my invention is applicable; but it is apparent that it may be applied to a great variety of furnaces, and hence, I do not desire to be understood as limiting myself to any particular construction of furnace; but having thus described my invention,

What I claim, and desire to secure by Letters Patent, is—

A furnace or fire-box, containing a reservoir, within which the coal may be partially or entirely coked before passing to the grate-bars, and in which reservoir the gases evolved by the distillation of the coal may be collected, and conducted by suitable pipes, so as to be discharged below the grate-bars, to be burned in passing through the bed of incandescent fuel thereon, substantially in the manner shown and described.

In testimony whereof, I have signed my name to this specification in the presence of two subscribing witnesses.

T. T. PROSSER.

Witnesses:
EDM. F. BROWN,
D. P. HOLLOWAY.